(12) United States Patent
Xiao et al.

(10) Patent No.: US 11,022,976 B2
(45) Date of Patent: Jun. 1, 2021

(54) PATH PLANNING METHOD OF INTELLIGENT ROBOT

(71) Applicant: AMICRO SEMICONDUCTOR CORPORATION, Zhuhai (CN)

(72) Inventors: Gangjun Xiao, Zhuhai (CN); Ming Li, Zhuhai (CN); Gentang Li, Zhuhai (CN)

(73) Assignee: AMICRO SEMICONDUCTOR CORPORATION, Zhuhai (CN)

( * ) Notice: Subject to any disclaimer, the term of this patent is extended or adjusted under 35 U.S.C. 154(b) by 149 days.

(21) Appl. No.: 16/094,471

(22) PCT Filed: Apr. 7, 2017

(86) PCT No.: PCT/CN2017/079783
§ 371 (c)(1),
(2) Date: Oct. 18, 2018

(87) PCT Pub. No.: WO2018/120489
PCT Pub. Date: Jul. 5, 2018

(65) Prior Publication Data
US 2019/0129433 A1    May 2, 2019

(30) Foreign Application Priority Data

Dec. 29, 2016   (CN) .......................... 201611244989.6

(51) Int. Cl.
*G05D 1/02* (2020.01)
*G06K 9/00* (2006.01)
*G05D 1/00* (2006.01)

(52) U.S. Cl.
CPC ......... *G05D 1/0214* (2013.01); *G05D 1/0088* (2013.01); *G05D 1/0238* (2013.01); *G06K 9/00496* (2013.01); *G05D 2201/0203* (2013.01)

(58) Field of Classification Search
None
See application file for complete search history.

(56) References Cited

U.S. PATENT DOCUMENTS 5,402,051 A       3/1995  Fujiwara et al.
9,486,921 B1 *   11/2016  Straszheim ............ B25J 9/1679
(Continued)

FOREIGN PATENT DOCUMENTS

CN       102138769 A       8/2011
CN       104972462 A      10/2015
(Continued)

*Primary Examiner* — Shelley Chen
(74) *Attorney, Agent, or Firm* — Bayramoglu Law Offices LLC

(57) ABSTRACT

A path planning method of an intelligent robot includes: (1) dividing the operating space into a plurality of rectangular virtual regions having areas of n*m square meters; (2) controlling the intelligent robot to traverse each rectangular virtual region with bow-shaped behavior; (3) when moving in bow-shape, building a raster map with the distance information acquired by distance information sensor, angle information acquired by angle information sensor, collision information acquired by collision detection sensor and obstacle information acquired by obstacle detection sensor, and marking the pass points, obstacle points and collision points; (4) analyzing the raster map in real time to judge if the entire operating space has been fully traversed: if so, moving to step (5); otherwise, returning to step (2); (5) controlling the intelligent robot to make an alongst behavior, and marking the alongst behavior points on the raster map.

14 Claims, 5 Drawing Sheets

(56) References Cited

U.S. PATENT DOCUMENTS

| | | | |
|---|---|---|---|
| 9,630,319 B2* | 4/2017 | Vicenti | G05D 1/0219 |
| 9,802,317 B1* | 10/2017 | Watts | B25J 9/1687 |
| 2007/0293958 A1* | 12/2007 | Stehle | G06Q 30/0207 |
| | | | 700/30 |
| 2009/0281661 A1* | 11/2009 | Dooley | B60L 50/52 |
| | | | 700/258 |
| 2011/0202175 A1* | 8/2011 | Romanov | B25J 5/00 |
| | | | 700/250 |
| 2011/0288684 A1* | 11/2011 | Farlow | G05D 1/0038 |
| | | | 700/264 |
| 2016/0271795 A1* | 9/2016 | Vicenti | B25J 9/163 |
| 2018/0267552 A1* | 9/2018 | Artes | A47L 9/2805 |

FOREIGN PATENT DOCUMENTS

| | | | | |
|---|---|---|---|---|
| CN | 104977926 A | | 10/2015 | |
| CN | 106020207 A | | 10/2016 | |
| DE | 102008050206 A1 * | | 5/2010 | G05D 1/0274 |
| EP | 0142594 A1 | | 5/1985 | |
| JP | 2002360478 A | * | 12/2002 | |
| JP | 2004326692 A | * | 11/2004 | |
| JP | 2009265801 A | * | 11/2009 | |

* cited by examiner

PATH PLANNING METHOD OF INTELLIGENT ROBOT

CROSS REFERENCE TO RELATED APPLICATIONS

This application is the national phase entry of International Application No. PCT/CN2017/079783, filed on Apr. 7, 2017, which is based upon and claims priority to Chinese Patent Application No. 201611244989.6, filed on Dec. 29, 2016, the entire contents of which are incorporated herein by reference.

TECHNICAL FIELD

This invention herein belongs to the field of intelligent control, especially relates to a path planning method of intelligent robot.

BACKGROUND

As a key factor in the transformation process of world economy and industry growth mode, intelligent robot is entering a new stage of development. Intelligent robots are the manufacturing equipment, equipment tools and service consumables having the abilities of perception, decision-making and execution. The intelligent machine used as manufacturing equipment in production process and environment is called industrial robot; the intelligent machine used as consumable for individual or household service is called household service robot; and the intelligent machine used as equipment tools for the service and maintenance under special environment is called special service robot.

Set household sweeping robot as an example. Household sweeping robot is also called automatic cleaning machine, intelligent cleaner, robotic vacuum cleaner, etc. It is a kind of intelligent household appliance, and it is able to clean the floor automatically with certain degree of artificial intelligence.

Sweeping robot needs to cover the entire room following certain path planning, so as to achieve the goal of traversal. Path planning is divided into random traversal and planning traversal.

Random traversal, means robot tries to cover work zone according to certain moving algorithm, such as triangular and pentagonal tracks; once it encounters an obstacle, it will execute corresponding steering function. This is a low-cost strategy exchanging time into space, and if time is not counted in, it is able to reach a coverage rate of 100%. Random covering method doesn't need positioning, has no environmental map, and cannot make path planning. At present, most of the sweeping robots of iRobot adopt this method.

Planning traversal, means when robot is walking, it will make an environmental map, then analyze the map in real time to complete new path planning, so as to clean the entire room. This method is very efficient, and it is able to finish cleaning with the fastest speed while ensuring coverage at the same time.

Planning clean herein needs to solve three problems:
1. Build a map and be able to locate (to ensure the position of robot).
2. Navigation, from start position to target position, and it could avoid obstacles automatically in the process of navigation.
1. Method to Traverse the Entire Room.

SUMMARY

In this invention, a low-cost robot path planning method is provided, which is able to make an effective raster map with error controllable only relying on the distance, angle, collision and obstacle information of robot's behaviors, so as to realize path planning. Purpose of this invention can be realized with the technical solution below:

A path planning method of intelligent robot, the said intelligent robot contains main control module, moving wheel, collision detection sensor, obstacle detection sensor, distance information sensor and angle information sensor, is characterized in the methods, comprising:

(1) Divide the operating space into several rectangular virtual regions in n*m square meters;

(2) Control the intelligent robot to traverse each virtual region with rectilinear-shaped behavior;

(3) When moving in a rectilinear-shape, intelligent robot builds a raster map with the distance information acquired by distance information sensor, angle information acquired by angle information sensor, collision information acquired by collision detection sensor and obstacle information acquired by obstacle detection sensor, and marks the pass points, obstacle points and collision points;

(4) Analyze the map having been built in real time to judge if the entire operating space has been fully traversed: if so, move to Step (5); otherwise, return to Step (2);

(5) Control the intelligent robot to make an alongst behavior, and mark the alongst behavior points on the map.

As a specific technical solution, the said rectilinear-shaped behavior comprises: first, go straight until finding an obstacle, or reaching the boundary of any said virtual region; second, after finding an obstacle or reaching the boundary of any said virtual region, turn 90°; third, go straight for a preset distance L or until finding an obstacle; fourth, turn 90° and return to the first step.

As a specific technical solution, the preset distance L in the third step of the said rectilinear-shaped behavior is half of the width of robot.

As a specific technical solution, each raster in the said raster map is expressed with a digital sequence, comprising: the digital segment used to express the raster locates in that virtual region, the digital segment used to express if the intelligent robot has ever reached the raster, the digital segment used to express if the raster has any obstacle, the digital segment used to express if the intelligent robot has any collision in the raster, and the digital segment used to express intelligent robot has passed by the raster when walking along side.

As a specific technical solution, the said raster map can be expressed in the form of: using different colors to express the rasters, pass points, obstacle points, collision points and alongst behavior points that haven't been marked by the intelligent robot respectively.

As a specific technical solution, the boundary of the first virtual region among the said several rectangular virtual regions can be defined through: the method to define vertical boundary: when the intelligent robot starts, set the previous moving direction as a boundary, turn right at the first time, and the parallel line in n meter at right is defined as another boundary, and the vertical boundary has already been set when the intelligent robot starts; the method to define horizontal boundary: when moving along the vertical side, it will constantly compute the biggest and smallest coordinate points on the map that the intelligent robot has walked by along the vertical side, and when the difference between the biggest and the smallest coordinate points reaches m meter, the line that passes the biggest and smallest coordinate points and is perpendicular to the vertical boundary will be defined as horizontal boundary.

As a specific technical solution, a new virtual region in the said several virtual regions can be analyzed and defined through: when it finishes traversing the first virtual region, analyze the coordinate points on its four virtual boundaries, if any virtual boundary has two and more continuous coordinate points and the intelligent robot passes by normally without any collision nor obstacles nearby, a new region is considered to exist beside the virtual boundary; then save the new region into the arrays of new region of the virtual region and choose to enter into the region that is nearest to the intelligent robot from the arrays of new region; then define the boundary of the virtual region that is newly entered with the method to define the boundary of the said first virtual region, and after traversing the new virtual region, delete corresponding new region information from the arrays of new region; continue this method, and when no new region is found in the arrays of new region any more, rectilinear-shaped behavior ends, and it means the entire operating space has been fully traversed.

As a specific technical solution, when the intelligent robot traverses a virtual region with rectilinear-shaped behavior, the conditions to exit rectilinear-shaped behavior comprise: Condition 1: in the third step of going straight in rectilinear-shaped behavior, if obstacles are found for two consecutive times, then shorten the distance of the first step of going straight; in the first step of going straight in rectilinear-shaped behavior, if moving length is shorter than half of the width of intelligent robot for two consecutive times, then exit rectilinear-shaped behavior; Condition 2: in the process of rectilinear-shaped behavior, constantly analyze if the third step of going straight in rectilinear-shaped behavior is full of obstacles; if so, exit rectilinear-shaped behavior.

As a specific technical solution, when a rectilinear-shaped behavior ends, analyze the map to find the omitted local region that is nearest to the intelligent robot; then navigate the intelligent robot to the omitted local region; then, restart rectilinear-shaped behavior until finish traversing the virtual region.

As a specific technical solution, the method to judge if there is any omitted local region refers to: judge if it has two consecutive boundary points along the direction of going straight in the third step of rectilinear-shaped behavior or along the reverse direction of 180°; if so, it means here exists omitted local region, the said boundary point is the point on the boundary of map, and the intelligent robot passes by normally without collision nor obstacles nearby.

As a specific technical solution, among all the omitted local regions, find the omitted local region that is nearest to the intelligent robot and keep starting rectilinear-shaped behavior.

As a specific technical solution, the method to define the said boundary points comprises: (a) judge if the point has been passed by normally without collision nor obstacles being detected: if so, move to Step (b); otherwise, it ends; (b) judge if the robot has not passed by the previous point without collision nor obstacles being detected: if so, move to Step (c); otherwise, it ends; (c) this point is defined as boundary point. Herein, the said previous point refers to current point, which is the next coordinate along the direction of going straight in the third step of rectilinear-shaped behavior or along the reverse direction of 180°.

As a specific technical solution, in the process of traversing the entire operating space, specific method to define the omitted local regions having not been traversed comprises: (A) traverse arrays of the entire map to judge if current point is the last point: if so, it ends; otherwise, move to Step (B); (B) judge if current point is virtual boundary point: if so, move to Step (A); otherwise, move to Step (C); (C) judge if current point is boundary point: if so, move to Step (D); otherwise, move to Step (A); (D) judge if the boundary point has one or more adjacent points as boundary point: if so, move to Step (E); otherwise, move to Step (A); (E) save the point into the arrays of omitted local region.

As a specific technical solution, the said alongst behavior comprises: according to the map having been built, compute total length of the boundary of the regions having been traversed; divide the total length by the speed of advance when the intelligent robot moves along side to get the time of traversing alongst; start moving along side when the alongst time is up and finish alongst behavior.

This invention adopts a rectilinear-shaped path to traverse the room in virtual regions. As long as in the process of rectilinear-shaped behavior, try to avoid collision and control the speed to be not too fast and keep stable when turning for 90°, and it will cause smaller errors to wheel coder and gyroscope in this way, so as to ensure the map recorded in the process of rectilinear-shaped behavior to be effective. With this method of traversing room in rectilinear-shaped behavior, it provide a possibility that makes a map with controllable error with no need for calibration.

DETAILED DESCRIPTION

Figure 1:
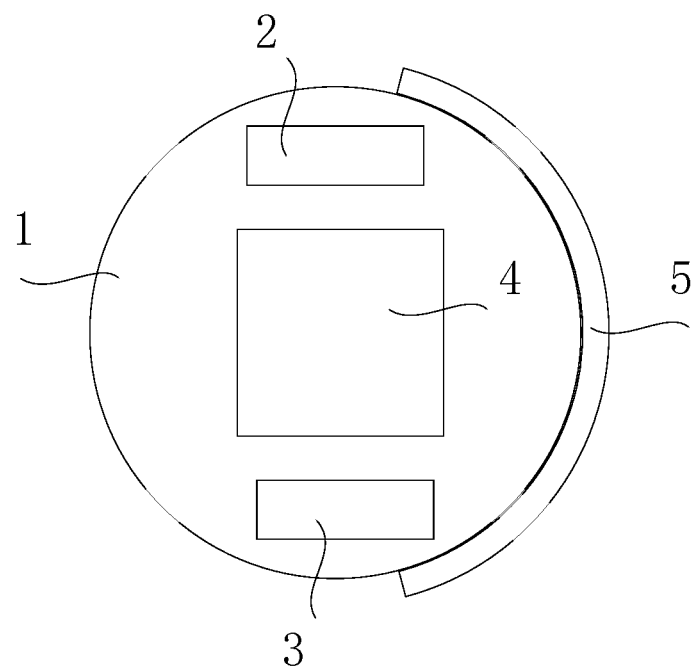
FIG. 1 is modular diagram of intelligent robot provided in the embodiment of this invention.

Integrating attached drawings, specific execution mode of this invention is further illustrated below:

As it is shown in FIG. 1, as to the path planning method of intelligent robot provided in this embodiment, the intelligent robot that it is based on the said method is composed of moving body 1, main control module 4, sensor set 5, power module and regional operating module. Herein, moving body 1 is composed of embodiment, moving wheels 2 & 3. Sensor set 5 is composed of collision detection sensor, fall-arrest detection sensor, obstacle detection sensor, distance information sensor and angle information sensor, all of which connect to main control module with electricity.

Specifically, when the intelligent robot encounters an obstacle, collision detection sensor will make a judgment to say that it collides with obstacle and notify main control module 4; when the intelligent robot is hung in the air, fall-arrest detection sensor will make a judgment to say that it is in danger and notify main control module 4; obstacle detection sensor is used to detect if any obstacle appears nearby and notifies main control module 4 in a detection distance of 10 cm, composing of five IR distance measurement sensors at the front, left front, right front, left and right. Distance information sensor is a wheel coder, and angle information sensor is a gyroscope. Regional operating module refers to the module having certain functions over the region that the robot locates in, and it can be one or several of cleaning component, camera component, humidifying component, dehumidifying component and deinsectization component. In this embodiment, it illustrates with cleaning component as an example, namely the robot mentioned in this embodiment is a cleaning robot.

Figure 2:
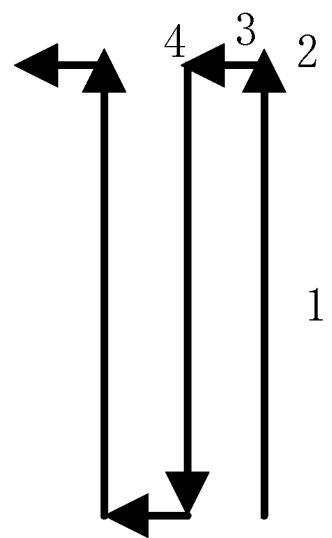
FIG. 2 is path map of the robot's rectilinear-shaped behavior in the path planning method provided in the embodiment of this invention.

In the path planning method of intelligent robot provided in this embodiment, it adopts rectilinear-shaped path. As it is shown in FIG. 2, it repeats these four steps again and again, namely realizing rectilinear-shaped path:

First: go straight until finding an obstacle or reaching the boundary of virtual region.

Second: after finding an obstacle, turn 90°.

Third: go straight for 150 mm (about half of the diameter or width of the intelligent robot) or until finding an obstacle.

Fourth: turn 90°.

The advantage of rectilinear-shaped path lies in that the intelligent robot only goes straight or turns 90°. We know that, error of wheel coder is mainly caused by wheel slips; and the error of gyroscope is mainly caused by exceeding the measurement range of angular velocity when the intelligent robot turns too fast or shakes. In the process of rectilinear-shaped path, use IR distance measurement sensor to try to avoid collision, and use black-white universal wheel to detect if the intelligent robot slips. When slip happens, ignore the advance distance given by wheel coder when it slips. Besides, control the speed to be not too fast and keep stable when turning 90°, and the errors of both wheel coder and gyroscope will become small in this way, so as to ensure the map recorded in the process of rectilinear-shaped path to be effective.

In the path planning method of intelligent robot provided in this embodiment, raster map is adopted when making a map. The distance information acquired by distance information sensor, the angle information acquired by angle information sensor, the collision information acquired by collision detection sensor and obstacle information acquired by obstacle detection sensor are used to build a raster map, mark the pass points, obstacle points and collision points. The intelligent robot updates the map while walking, and it will update situation of all the places that the robot has passed by onto the raster map.

The raster map having been made is saved in main control module 4. The raster map can be expressed as: black raster means the robot hasn't marked it, green raster means the robot has passed by the points normally, red raster means obstacle points, blue raster means collision points and white raster means the points having gone through alongst behavior.

Herein, each raster can be expressed with an 8-bit number. The higher four are used to take down regional information, representing that the raster locates in that region, and thus it supports 16 regions the most. The lower four are used to show the actual information on the map: 0-bit shows if the robot has reached this raster, "0" means no and "1" means yes; 1-bit shows if it has any obstacle in this raster, "0" means no and "1" means yes; 2-bit shows if collision happens in this raster, "0" means no and "1" means yes; 3-bit means the robot has passed by this raster when it walks along side.

In the path planning method of intelligent robot provided in this embodiment, the operating space is divided into several rectangular virtual regions in n*m square meters, such as the virtual region in 4*4 square meters. After traversing each virtual region, the intelligent robot will traverse next region.

Figure 3:
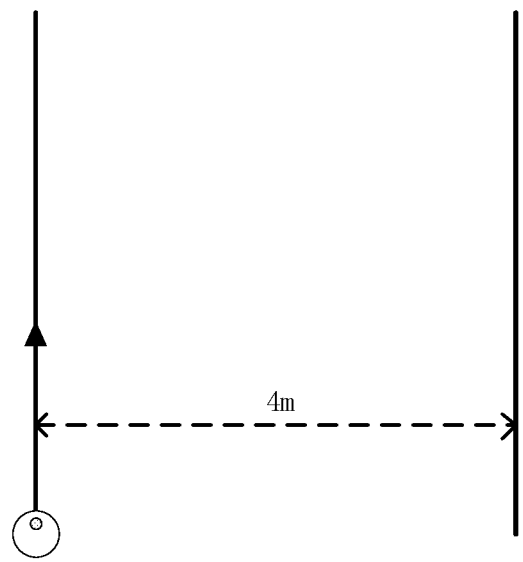
FIG. 3 is diagram for the boundary definition of virtual regions in the path planning method provided in the embodiment of this invention.

Define the First Virtual Region:

As it is shown in FIG. 3, vertical boundary can be defined: when the intelligent robot starts, with the forward direction as a boundary, turn right at the first time, and a parallel line in 4 meters at right is defined as another boundary. The vertical boundary has already been set when the intelligent robot starts.

Horizontal boundary: when moving vertically, the intelligent robot will constantly compute the biggest and smallest coordinates on the map having been passed by the robot along the vertical direction, and when the difference between the biggest and smallest coordinates reaches 4 meters, the line that passed by the vertically biggest and smallest coordinates and is perpendicular to the vertical boundary is defined as horizontal boundary.

Figure 4:
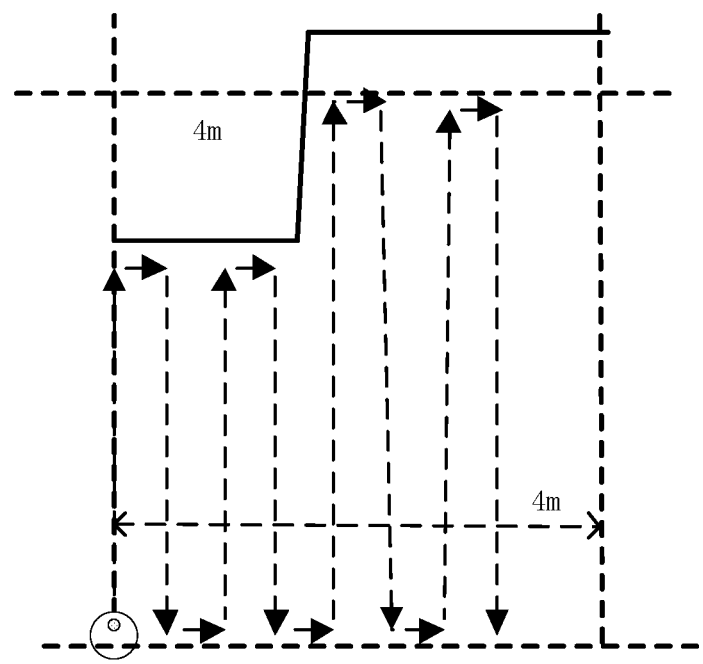
FIG. 4, FIG. 5 & FIG. 6 are diagrams for the different situations when robot walks in virtual regions in rectilinear-shaped behaviors and encounters actual boundaries in the path planning method provided in the embodiment of this invention.

As it is shown in FIG. 4, the rectangular region marked with dotted line is a virtual region, and the solid line is an actual boundary of operating space.

Analyze and Define New Virtual Region:

When finish traversing the first virtual region, analyze the coordinates on its four virtual boundaries. If any virtual boundary has two or more continuous coordinates (with an interval bigger than 0.3 m), the intelligent robot passes by normally without collision nor obstacles nearby, a new region is considered to exist beside the virtual boundary. Then, the new region should be saved into the arrays of new region of the virtual region, and then select the region that is nearest to the intelligent robot among the arrays of new region to get in. After traversing a new virtual region, delete corresponding new region information from the arrays of new region; continue this method, and when no new region is found in the arrays of new region any more, rectilinear-shaped behavior ends, and it means the entire operating space has been fully traversed.

Specifically, when the intelligent robot traverses a virtual region with rectilinear-shaped behavior, the conditions to exit rectilinear-shaped behavior comprise:

Condition 1:

In the third step of going straight, if obstacles are found for two consecutive times, then shorten the distance of the first step of going straight;

In the first step of going straight, if moving length is shorter than 150 mm (about half of the radius or width of intelligent robot) for two consecutive times, then exit rectilinear-shaped behavior.

Condition 2:

In the process of rectilinear-shaped behavior, constantly analyze if the third step of going straight in rectilinear-shaped behavior is full of obstacles; if so, exit rectilinear-shaped behavior.

Figure 5:
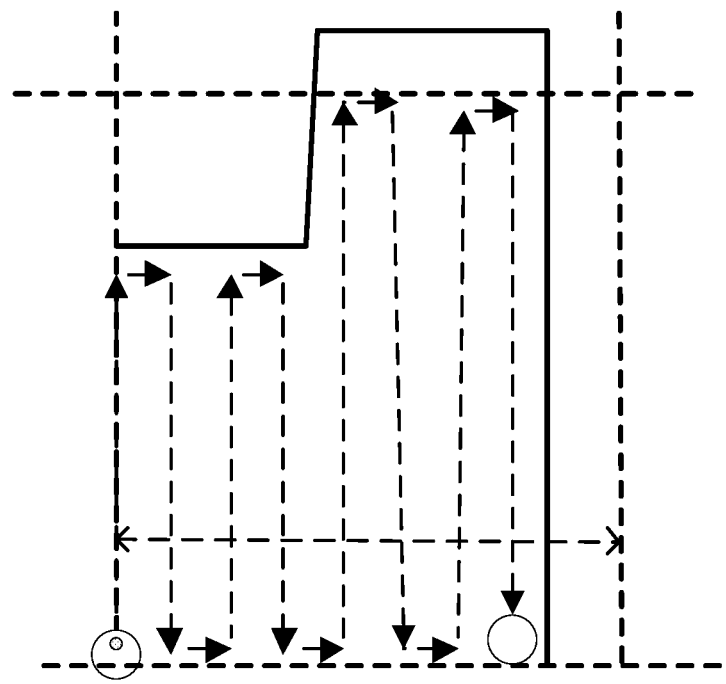

As it is shown in FIG. 5, the rectangular region marked with dotted line is a virtual region, and the solid line is an actual boundary of operating space. When the intelligent robot walks to the wall, i.e. the point at bottom right shown in the figure and if it finds the third step of going straight in the rectilinear-shaped behavior is full of obstacles, it is considered as rectilinear-shaped behavior ends.

Figure 6:
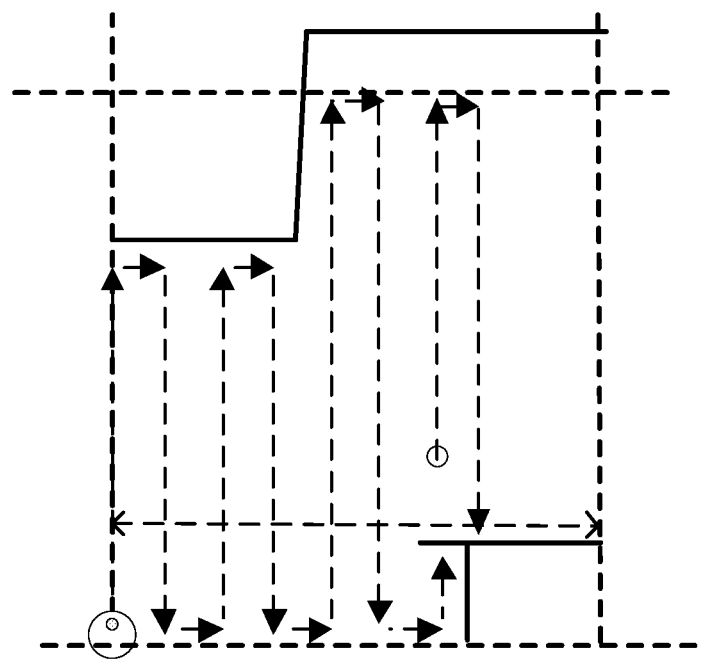

When a rectilinear-shaped behavior ends, analyze the map to find the omitted region that is nearest to the intelligent robot at present, then navigate the robot to the omitted region and restart rectilinear-shaped behavior. As it is shown in FIG. 6, the rectangular region marked with dotted line is a virtual region, and the solid line is an actual boundary of operating space. When the intelligent robot traverses the virtual region, it is trapped in a small region at the corner; when canceling rectilinear-shaped behavior at this time, a local region having not been traversed will be found aside, then navigate the robot to this region, following the last rectilinear-shaped behavior, and keep traversing until the virtual region is fully traversed.

The Method to Analyze and Judge if there is any Omitted Local Region is as Follows:

Analyze and judge if there are two continuous boundary points (0.3 m, diameter or width of the intelligent robot) on the forward direction (going straight of third step) or the reverse direction of 180° of the rectilinear-shaped behavior, if so, it is considered as having omitted local region here.

Among all the omitted local regions, find the one that is nearest to the intelligent robot; then navigate robot to this position, start rectilinear-shaped behavior and keep traversing.

When no omitted local regions appear any more, it is considered as this virtual region is finished traversing.

Boundary point: means the point on the boundary of map that the intelligent robot passes by normally without collision nor obstacles.

Figure 7:
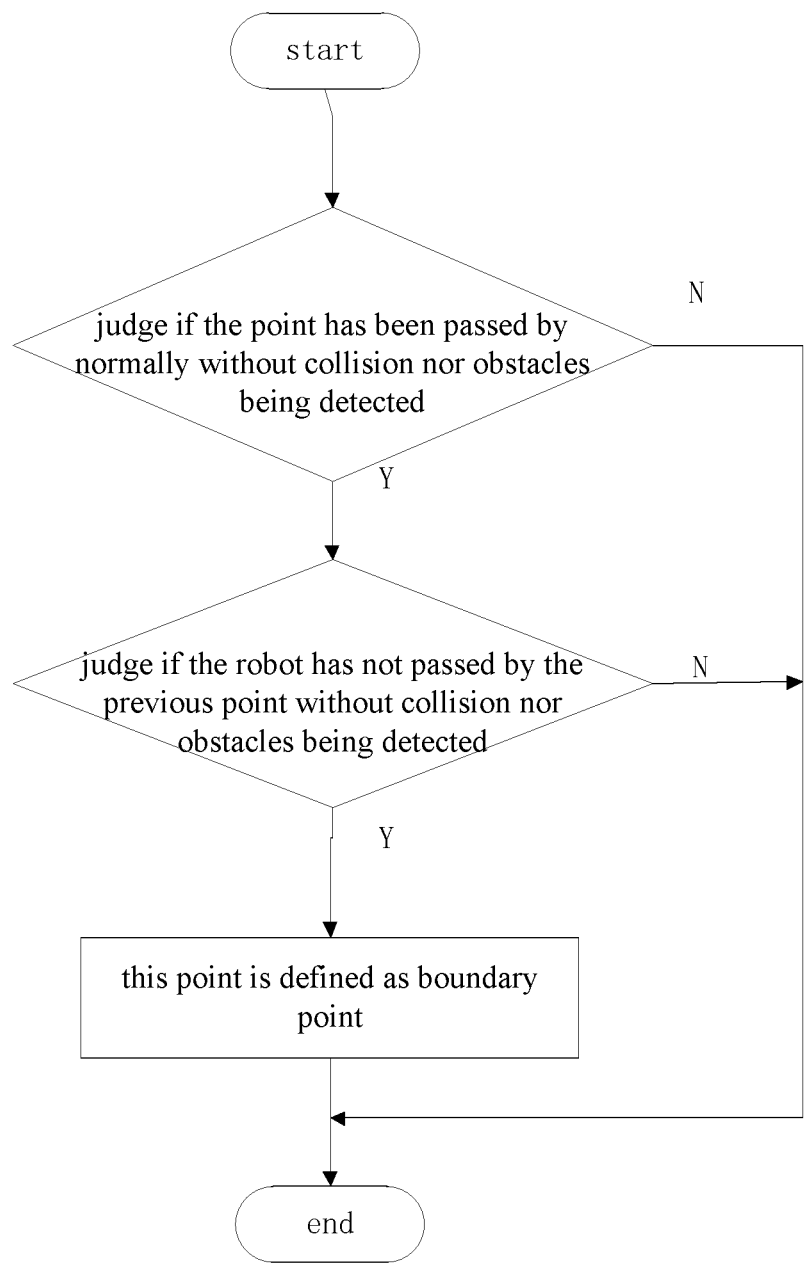
FIG. 7 is flowchart to define boundary points in the path planning method provided in the embodiment of this invention.

Herein, as it is shown in FIG. 7, the method to define boundary points comprises: (a) judge if the point has been passed by normally without collision nor obstacles being detected: if so, move to Step (b); otherwise, it ends; (b) judge if the robot has not passed by the previous point without collision nor obstacles being detected: if so, move to Step (c); otherwise, it ends; (c) this point is defined as boundary point.

The said previous point refers to current coordinate, which is the next coordinate along the forward direction (going straight of the third step) (or along the reverse direction of 180°) of rectilinear-shaped behavior.

Figure 8:
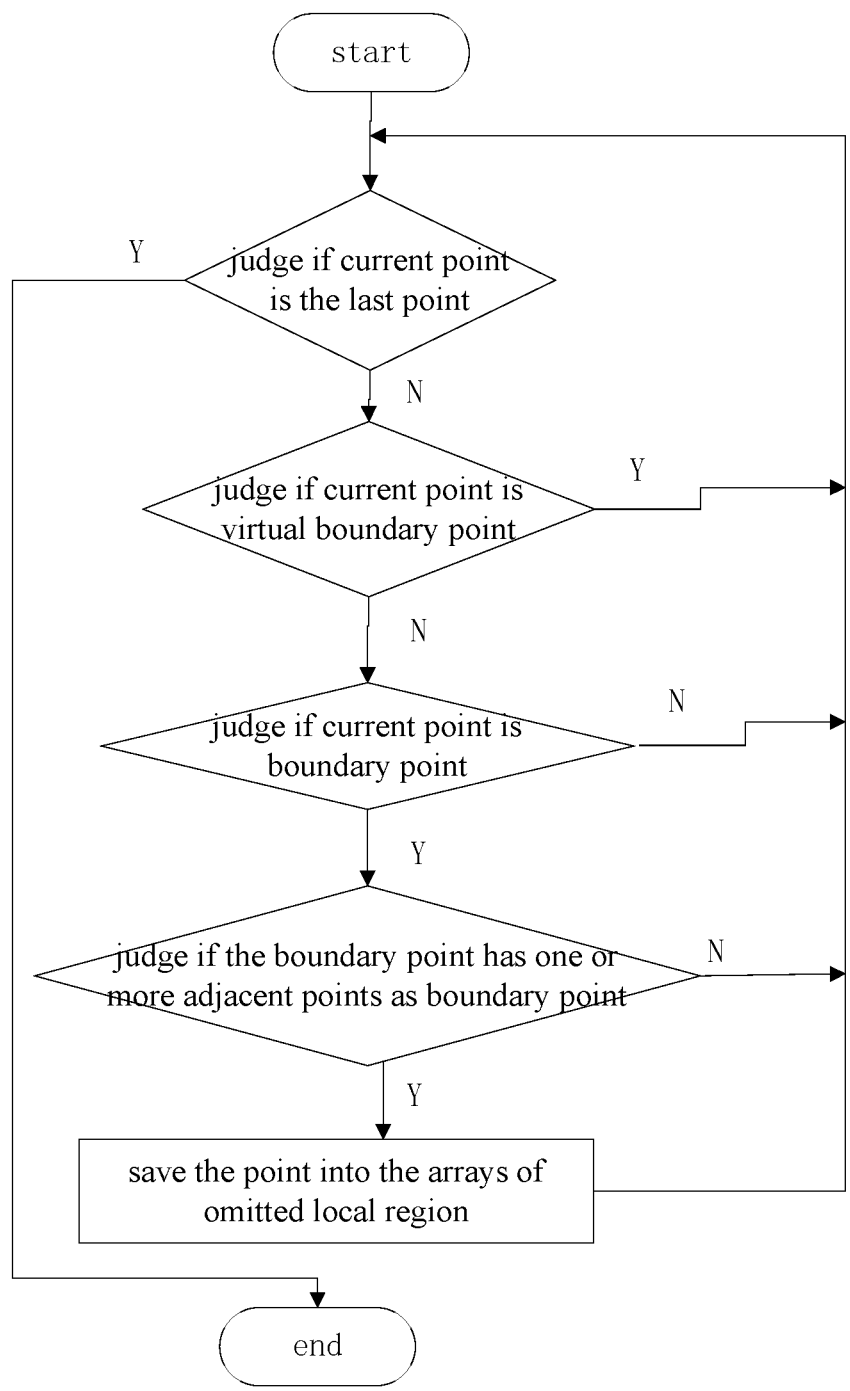
FIG. 8 is flowchart to define the omitted local regions having not been traversed in the path planning method provided in the embodiment of this invention.

As it is shown in FIG. 8, in the process of traversing the entire operating space, specific method to define the omitted local regions having not been traversed comprises: (A) traverse the arrays of the entire map to judge if current point is the last point: if so, it ends; otherwise, move to Step (B); (B) judge if current point is virtual boundary point: if so, move to Step (A); otherwise, move to Step (C); (C) judge if current point is boundary point: if so, move to Step (D); otherwise, move to Step (A); (D) judge if the boundary point has one or more adjacent points as boundary point: if so, move to Step (E); otherwise, move to Step (A); (E) save the point into the arrays of omitted local region.

Then, select the omitted local region point that is nearest to current coordinate as target point; then navigate the intelligent robot to this point, restart rectilinear-shaped behavior and keep traversing.

After traversing all virtual regions, according to the map having been built, compute total length of the boundary of the regions having been traversed; divide the total length by the speed of advance when the intelligent robot moves along side to get the time of traversing alongst; start moving along side when the alongst time is up and finish alongst behavior.

What is claimed:

1. A path planning method of an intelligent robot, wherein the intelligent robot comprises a main control module, a moving wheel, a collision detection sensor, an obstacle detection sensor, a distance information sensor and an angle information sensor;

the path planning method comprises the following steps:
(1) dividing an operating space into a plurality of rectangular virtual regions, wherein an area of each rectangular virtual region of the plurality of rectangular virtual regions is n*m square meters;
(2) controlling the intelligent robot to traverse each rectangular virtual region with a rectilinear-shaped behavior, wherein the rectilinear-shaped behavior comprises the following steps: first, going straight until finding an obstacle, or going straight until reaching a boundary of each rectangular virtual region; second, after finding the obstacle or reaching the boundary of each rectangular virtual region, turning 90°; third, going straight for a preset distance L or going straight until finding the obstacle; fourth, turning 90° and returning to the first step;
(3) moving in the rectilinear-shaped behavior, building a raster map with distance information acquired by the distance information sensor, angle information acquired by the angle information sensor, collision information acquired by the collision detection sensor and obstacle information acquired by the obstacle detection sensor, and marking pass points, obstacle points and collision points;
(4) analyzing the raster map in real time to judge if the entire operating space has been fully traversed: if so, moving to step (5); otherwise, returning to step (2);
(5) controlling the intelligent robot to make an alongst behavior, and marking alongst behavior points on the raster map; wherein the alongst behavior comprises of travelling over each traversed rectangular virtual region according to a computed time to travel each traversed rectangular virtual region;

wherein each raster in the raster map is expressed with a digital sequence, the digital sequence comprising: at least one digital segment configured to express a virtual region where this raster is located, at least one digital segment configured to express whether the intelligent robot has ever reached this raster, at least one digital segment configured to express whether at least one obstacle is existed on this raster, at least one digital segment configured to express whether the intelligent robot has a collision on this raster, and at least one digital segment configured to express the intelligent robot has passed through this raster when making the alongst behavior.

2. The path planning method of claim 1, wherein the preset distance L in the third step of the rectilinear-shaped behavior is half of a width of the intelligent robot.

3. The path planning method of claim 1, wherein each raster in the raster map is expressed with a digital sequence, the digital sequence comprises: a plurality of digital segments configured to express each raster locates in each rectangular virtual region, the plurality of digital segments comprise a digital segment configured to express if the intelligent robot has ever reached each raster, a digital segment configured to express if each raster comprises an obstacle, a digital segment configured to express if the intelligent robot comprises a collision in each raster, and a digital segment configured to express the intelligent robot has passed by each raster when walking along a side.

4. The path planning method of claim 1, wherein an expression form of the raster map is using different colors to express unmarked rasters, unmarked pass points, unmarked obstacle points, unmarked collision points and unmarked alongst behavior points respectively.

5. The path planning method of claim 1, wherein a boundary of a first rectangular virtual region is defined through the following methods:
  a first method to define a vertical boundary comprises: when the intelligent robot starts, setting a previous moving direction as a first boundary, turning right at the first time, and defining a n meter parallel line at right as a second boundary, wherein the vertical boundary has already been set when the intelligent robot starts;
  a second method to define a horizontal boundary comprises: when moving along a vertical side, constantly computing a biggest coordinate point and a smallest coordinate point of the intelligent robot on the raster map, and when a difference between the biggest coordinate point and the smallest coordinate point reaches m meter, defining a line passing through the biggest coordinate point and the smallest coordinate point as a third boundary, and a line perpendicular to the vertical boundary as a fourth boundary.

6. The path planning method of claim 5, wherein a new rectangular virtual region of the plurality of rectangular virtual regions is analyzed and defined through a third method comprising the following steps:
  when finishing traversing the first rectangular virtual region, analyzing coordinate points on four virtual boundaries of the first boundary, the second boundary, the third boundary and the fourth boundary; wherein if a virtual boundary comprises two and more continuous coordinate points and the intelligent robot passes by normally without a collision or the obstacle nearby, the new rectangular virtual region is considered to exist beside the first virtual boundary; then saving the new rectangular virtual region into arrays of the new rectangular virtual region of each rectangular virtual region and choosing to enter into a region closest to the intelligent robot from the arrays of the new rectangular virtual region; then defining a boundary of the new rectangular virtual region with the first method and the second method, and after traversing the new rectangular virtual region, deleting corresponding information of the new rectangular virtual region from the arrays of the new rectangular virtual region; and continuing the third method, when no new rectangular virtual region is found in the arrays of the new rectangular virtual region any more, ending the rectilinear-shaped behavior indicating the entire operating space has been fully traversed.

7. The path planning method of claim 6, wherein when the intelligent robot traverses each rectangular virtual region with the rectilinear-shaped behavior, conditions to exit the rectilinear-shaped behavior comprise; condition 1: in the third step of going straight in the rectilinear-shaped behavior, if the obstacles are found for two consecutive times, shortening a distance of going straight in the first step; in the first step of going straight in the rectilinear-shaped behavior, if a moving length is shorter than half of the width of the intelligent robot for two consecutive times, exiting the rectilinear-shaped behavior; condition 2: in a process of the rectilinear-shaped behavior, constantly analyzing if the third step of going straight in the rectilinear-shaped behavior is full of the obstacles; if so, exiting the rectilinear-shaped behavior.

8. The path planning method of claim 7, wherein when the rectilinear-shaped behavior ends, the raster map is analyzed to find an omitted local region closest to the intelligent robot in a plurality of omitted local regions; then the intelligent robot is navigated to the omitted local region; finally, the rectilinear-shaped behavior is restarted until finished traversing each rectangular virtual region.

9. The path planning method of claim 8, wherein a method to judge the omitted local region comprises: judging if two consecutive boundary points exist along a direction of going straight in the third step of the rectilinear-shaped behavior or along a reverse direction of 180°; if so, the omitted local region exists; each boundary point of the two consecutive boundary points is a point on a boundary of the raster map, and the intelligent robot passes by normally without the collision or the obstacle nearby.

10. The path planning method of claim 9, wherein in the plurality of the omitted local regions, the omitted local region closest to the intelligent robot is found, and the rectilinear-shaped behavior is kept to start.

11. The path planning method of claim 9, wherein a method to define each boundary point comprises: (a) judging if a point has been passed by normally without the collision or the obstacle being detected: if so, moving to step (b); otherwise, ending the method; (b) judging if the intelligent robot has not passed by a previous point without the collision nor the obstacle being detected: if so, moving to step (c); otherwise, ending; (c) defining the point as each boundary point; the previous point is a current point, the current point is located on a next coordinate along the direction of going straight in the third step of the rectilinear-shaped behavior along the reverse direction of 180°.

12. The path planning method of claim 11, wherein in a process of traversing the entire operating space, a method to define omitted local regions having not been traversed comprises: (A) traversing arrays of the entire raster map to judge if the current point is a last point: if so, ending the method; otherwise, moving to step (B); (B) judging if the current point is a virtual boundary point: if so, moving to step (A); otherwise, moving to step (C); (C) judging if the current point is each boundary point: if so, moving to step (D); otherwise, moving to step (A); (D) judging if each boundary point comprises one or more adjacent points as each boundary point: if so, moving to step (E); otherwise, moving to step (A); (E) saving the adjacent point into arrays of the omitted local region.

13. The path planning method of claim 1, wherein the alongst behavior comprises: according to the raster map having been built, computing a total length of a boundary of each rectangular virtual region having been traversed; dividing the total length by a speed of advance when the intelligent robot moves along each traversed rectangular virtual region to get time of traversing along the total length of each traversed rectangular virtual region; starting to move along the traversed rectangular virtual region wherein when the time of traversing along the total length of all traversed rectangular virtual regions is reached the alongst behavior is finished.

14. The path planning method of claim 3, wherein an expression form of the raster map is using different colors to express unmarked rasters, unmarked pass points, unmarked obstacle points, unmarked collision points and unmarked alongst behavior points respectively.

* * * * *